Inventors
Henry Shawbrook
Edward F. Hillier
By Reynolds, Beach & Christensen
Attorneys Inventors
Henry Shawbrook
Edward F. Hillier
By Reynolds, Beach & Christensen
Attorneys Patented Oct. 21, 1952

2,614,777

UNITED STATES PATENT OFFICE 2,614,777

SELF-CENTERING MEANS FOR AIRCRAFT CASTERABLE LANDING WHEEL MOUNTINGS

Henry Shawbrook and Edward F. Hillier, Cheltenham, England, assignors to Dowty Equipment Limited, Cheltenham, England Application June 22, 1951, Serial No. 232,908

10 Claims. (Cl. 244—104)

1

The present invention relates to aircraft casterable landing wheel mountings, and more particularly to what are commonly called "self-centering" means for resiliently returning the castor shaft of the mounting to a predetermined angular setting at which the landing wheel is in a fore-and-aft alignment and from which it can be forcibly swung in either direction against such resilience.

An object of the invention is to provide improved self-centering means operable throughout a predetermined angular range at either side of the centre position and permitting castoring throughout the remainder of the turning range.

The invention consists in an aircraft casterable landing wheel mounting, comprising a castor shaft carrying the wheel, fixed journal means supporting and guiding said shaft for rotation continuously through a 360° range, crank means fixed to said shaft eccentrically thereof for rotation conjointly therewith, means reciprocable transversely of the castor shaft axis and engageable with said crank means throughout a predetermined angular turning of the same to either side of a central position at which the wheel is in fore-and-aft alignment and disengageable from said crank means throughout the remainder of its turning range, centering spring means reacting oppositely upon the reciprocable means to return the same to an initial position corresponding to the centre position of the crank means and hence to the fore-and-aft position of the wheel, and further spring means to permit yielding, in a direction radially of the crank means, of one of the normally interengaged heads of the crank and of the reciprocable means respectively, which had been disengaged by relative rotation beyond the limits of the predetermined angular turning.

The reciprocable means and the crank means preferably engage one another throughout the predetermined angular range by two heads such as a fork member on one of said means, e. g. the reciprocable means, and a resilient plunger member on the other of said means, e. g. crank means, said fork member having cam surfaces engageable by the plunger member during either direction of return movement of the latter to its central position after disengagement from the fork member whereby to contract the plunger member to permit it to re-enter and reengage the fork member.

Other objects of the invention will be apparent from the following description given in conjunction with the accompanying drawings, of which:

2

Figure 1:
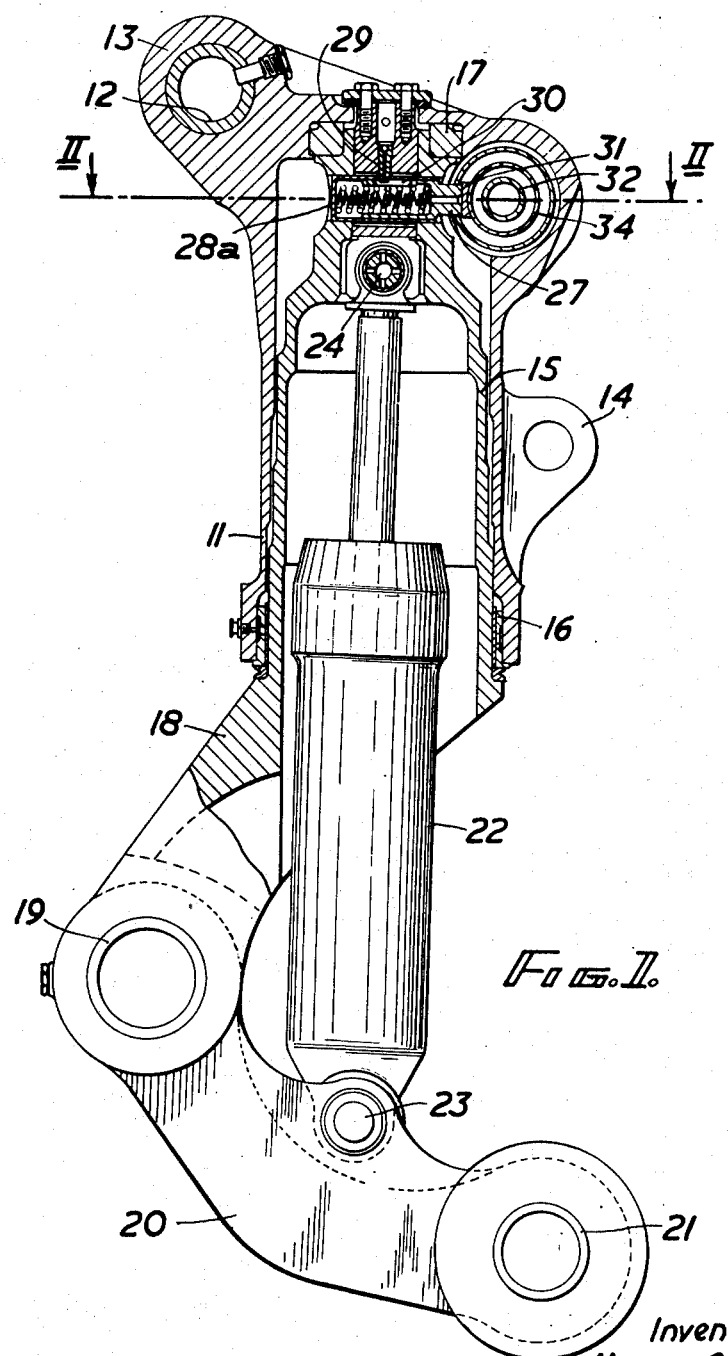
Figure 1 is a sectional side elevation of one example of aircraft casterable nose-wheel mounting having self-centering means in accordance with the invention.

The mounting shown in Figure 1 comprises a fixed outer casing 11 adapted to be secured to the aircraft structure about a shaft extending through the bearing 12 in the lug 13 so that the mounting can be retracted by retracting mechanism (not shown) connected with the apertured lug 14. A castor shaft 15 is journalled for 360° rotation within the casing 11 by journal bearings 16 and 17 at the lower and upper parts respectively of casing 11. The castor shaft 15 terminates at its lower end in a rearwardly extending bracket 18 to which is pivoted at 19 a lever 20 having a bearing 21 for the landing wheel spindle. Swinging of the lever 20 about its pivot 19 is controlled by a shock absorber 22 pivoted at 23 to the lever 20 and at 24 to the castor shaft 15.

The mounting includes self-centering mechanism for returning the castor shaft 15 into a predetermined alignment in which the landing wheel extends in a fore-and-aft plane. The self-centering mechanism comprises a spring box, indicated generally at 25, mounted on the fixed casing 11, the crank or driving means, indicated generally at 26, mounted transversely on and rotatable with the castor shaft 15.

The crank or driving means 26 comprises a plunger 27 which telescopes with respect to a fixed outer tubular casing 28 and is spring loaded to cause its outer head to assume its outer position by springs 28a disposed within the plunger 27 and casing 28. A pin 29 fixed to the castor shaft 15 extends through the plunger casing 28 to secure said casing against movement, and into a slot 30 in the plunger 27 to permit the plunger to move axially to an outer position limited by the slot but to prevent the plunger from rotating about its own axis.

Figure 2:
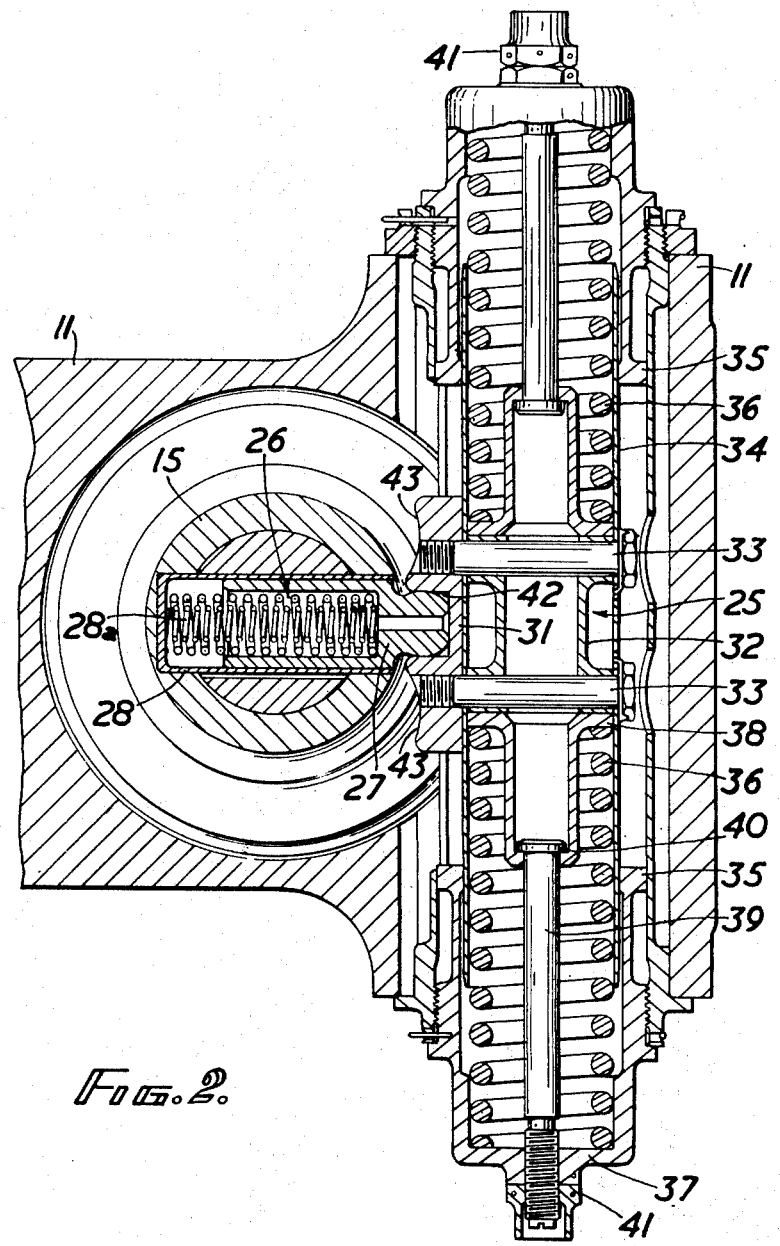
Figure 2 is an enlarged cross-sectional view through the self-centering means taken on the line II—II of Figure 1.

The spring box 25 comprises a reciprocable forked member 31 which together with a partition member 32 is secured by bolts 33 to a tube 34. The tube 34 is slidably mounted at its ends in cylindrical guides 35 fixed in the outer casing 11 of the mounting. The structure comprising the forked member or head 31, the partition 32 and the tube 34, is spring loaded to assume the central position shown in Figure 2 by springs 36 mounted within the tube 34 and within the corresponding cylindrical guide 35. Each spring 36 reacts at one end against the end wall 37 of the cylindrical guide and at the other end against an abutment member in the form of a cup washer 38 carried on a stem 39 which is fixed to the end wall 37. A head 40 on the stem 39 limits the movement of the cup washer 38 away from the end wall 37. The length of the stem 39 is adjustable by the screw and nut mechanism 41. The fork member 31 has a central channel 42 in which the nose of the plunger 27 is received when the castor shaft 15 is in an angular position corresponding to fore-and-aft alignment of the wheel. The nose of the plunger 27 will remain in engagement with the groove 42 of the fork member 31 for a predetermined degree of turning of the castor shaft 15 to either side of the central position, and turning of the shaft beyond this predetermined angle will cause the plunger 27 to leave the groove 42 so that the wheel and the castor shaft are freed from the spring box 25. The fork member 31 has at each side of the groove 42 a cam surface 43 which is engaged by the head of the plunger 27 during return movement of the latter in either direction to its central position after having become disengaged from the fork member. The appropriate cam surface 43 will engage the rounded side of the head of the plunger 27 and cause the plunger to contract against the influence of its springs 29 to permit the plunger 27 to re-enter the groove 42 of the fork member; thus the two heads reengage after their disengagement. The springs 36 of the self-centering spring box will not prevent castoring of the mounting but as soon as the aircraft becomes airborne and the landing wheel is freed from the aircraft's weight, the springs 36 will act to return and hold the fork member or head 31 in its central position and thus to return and hold the castor shaft and landing wheel in fore-and-aft alignment. During castoring of the landing wheel while the plunger 27 engages the groove 42 of the fork member, the plunger 27 will cause the fork member to move in one direction and so to slide the tube 34 and the partition 32 correspondingly. One of the springs 36 will then be compressed while its cup washer 38 slides along the stem 39 while the other spring 36 is unable to extend owing to engagement of its cup washer with the under surface of the head 40 of its stem 39.

The self-centering mechanism above described thus operates upon the castor shaft throughout a predetermined degree of turning of said shaft in either direction away from the central position and permits the shaft to castor freely throughout the remainder of its turning range. The formation of the cam surfaces on the fork member ensures re-engagement of the plunger within the fork member during return movement of the castor shaft. It is to be noted that although a wide angle of castoring may be needed during manoeuvring of the aircraft on the ground, during take-off of the aircraft the landing wheel and with it the castor shaft will inevitably be in a position which differs little from the fore-and-aft alignment. Once the aircraft becomes airborne the self-centering means will position and hold the castor shaft in the desired angular setting.

Figure 3:
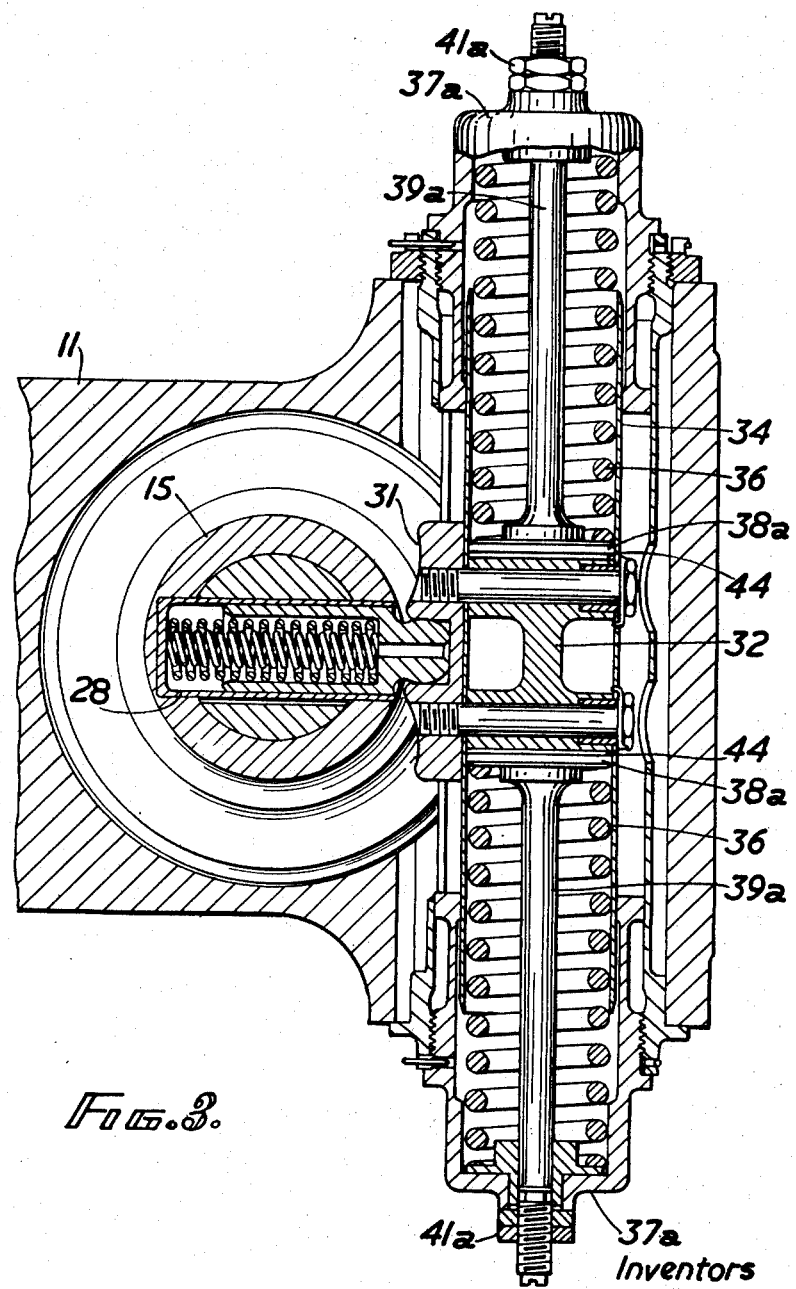
Figure 3 is a view similar to Figure 2 illustrating a modification.

In the modification shown in Figure 3 the stems 39a of the spring box are slidable through the end walls 37a of the spring box and the springs 36 react between the end walls 37a and abutment discs 38a secured to the ends of the stems 39a. Movement of the stems 39a into the spring box is limited by adjustable nuts 41a. Each abutment disc 38a substantially fits slidably within the tube 34 and there is secured to the face of each disc 38a a shock absorbing buffer 44 which substantially seals the disc with respect to the tube 34. When the tube 34 together with its partition 32 and fork member 31 is returning to its central position, the entrapment of air beween the stationary shock absorbing buffer 44 and the moving partition 32 cushions the impact between the partition and buffer.

We claim:

1. An aircraft castorable landing wheel mounting, comprising a castor shaft carrying the wheel, fixed journal means supporting and guiding said shaft for rotation continuously through a 360° range, crank means fixed to said shaft and directed laterally thereof for rotation conjointly therewith, means reciprocable transversely of the castor shaft axis and engageable with said crank means throughout a predetermined angular turning of the same to either side of a central position at which the wheel is in fore-and-aft alignment and disengageable from said crank means throughout the remainder of its turning range, and centering spring means reacting oppositely upon the reciprocable means to return the same to an initial position corresponding to the centre position of the crank means and hence to the fore-and-aft position of the wheel.

2. The castorable wheel mounting defined in claim 1, wherein the reciprocable means and the crank means engage one another throughout the predetermined angular range by a fork member on one of said means and a resilient plunger member on the other of said means, said fork member having cam surfaces engageable by the plunger member during either direction of return movement of the latter to its central position after disengagement from the fork member whereby to contract the plunger member to permit it to re-enter the fork member.

3. The castorable wheel mounting defined in claim 2, wherein the plunger member is on the crank means, and the fork member is on the reciprocable means.

4. The castorable wheel mounting defined in claim 1, wherein the reciprocable means comprises a tube, and said tube is slidable in oppositely disposed fixed cylindrical guides and forms with the same enclosures for two centering springs.

5. The castorable wheel mounting defined in claim 4, wherein each of the two centering springs reacts at its outer end upon an end wall of the corresponding cylindrical guide and at its inner end upon an abutment member mounted slidably on the guide for limited movement away from its end wall into centering engagement with a partition across the tube of the reciprocable means.

6. The castorable wheel mounting defined in claim 5, wherein shock absorbing buffer means is provided between each abutment member and the adjacent end of the partition.

7. The castorable wheel mounting defined in claim 5, wherein each abutment member is slidable on a stem extending fixedly from the end wall of the corresponding guide.

8. The castorable wheel mounting defined in claim 5, wherein each abutment member is fixed upon a stem extending slidably through the end wall of the corresponding guide.

9. The castorable wheel mounting defined in claim 8, wherein each abutment member is in slidable sealing engagement with the inner surface of the tube of the reciprocable means.

10. An aircraft castorable landing wheel mounting including a casing, an upright wheel-mounting shaft, journal means supporting and guiding said shaft in said casing for 360° rotation, a crank arm formed with a head at its outer end and directed laterally from and mounted on said shaft for rotation therewith to swing its head in a definite arcuate path, means mounted and guided on said casing for reciprocative movement transversely of the axis of said shaft, and including a head thereby movable in a path disposed on a chord of the path of the crank's head to either side of a neutral or centered position, the two heads being normally engaged so long as rotative movement of the crank arm's head does not exceed the opposite limits of such chord, but being disengageable by rotative movement of the crank arm and its head beyond either such limit, resilient centering means operatively connected to said reciprocable means and reacting from said casing to return the reciprocable means' head to said centered position whenever the two heads are not engaged, and tending to return the crank arm's head whenever the two heads are engaged, to said centered position, and further resilient means acting upon one of said heads to urge it into and to hold it in operative engagement with the other head, but yieldable in a direction generally lengthwise of the crank arm for reengagement of the two heads upon return of the crank arm and its head to centered position following disengagement of the heads and return of the reciprocable means and its head to such centered position.

HENRY SHAWBROOK.
EDWARD F. HILLIER.

REFERENCES CITED

The following references are of record in the file of this patent:

UNITED STATES PATENTS

| Number | Name | Date |
|---|---|---|
| 2,329,441 | Parker | Sept. 14, 1943 |
| 2,401,364 | Mercier | June 4, 1946 |
| 2,418,325 | Wassall | Apr. 1, 1947 |
| 2,508,067 | Bishop | May 16, 1950 |
| 2,543,233 | Dowty | Feb. 27, 1951 |